Oct. 15, 1929.  A. BIANCHI  1,731,607
VINE TRIMMING MACHINE
Filed Aug. 26, 1927
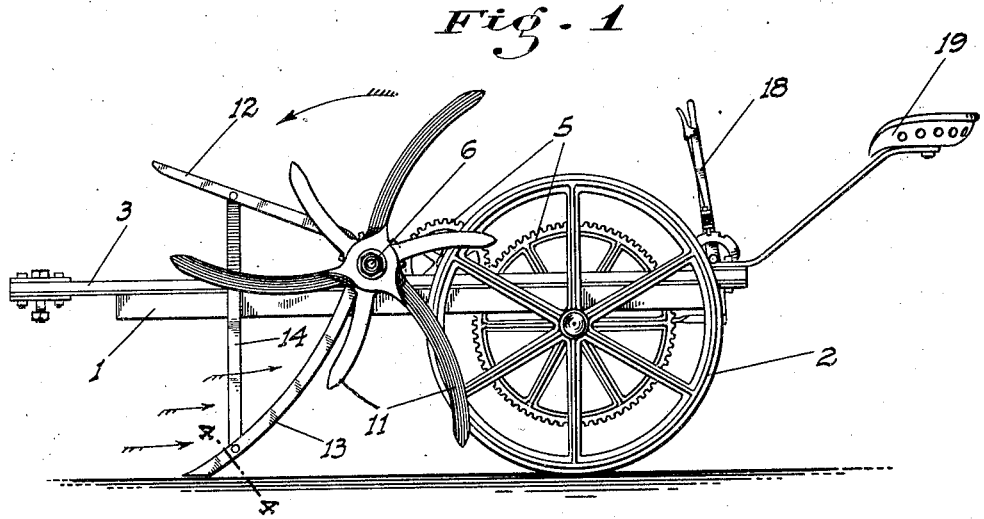
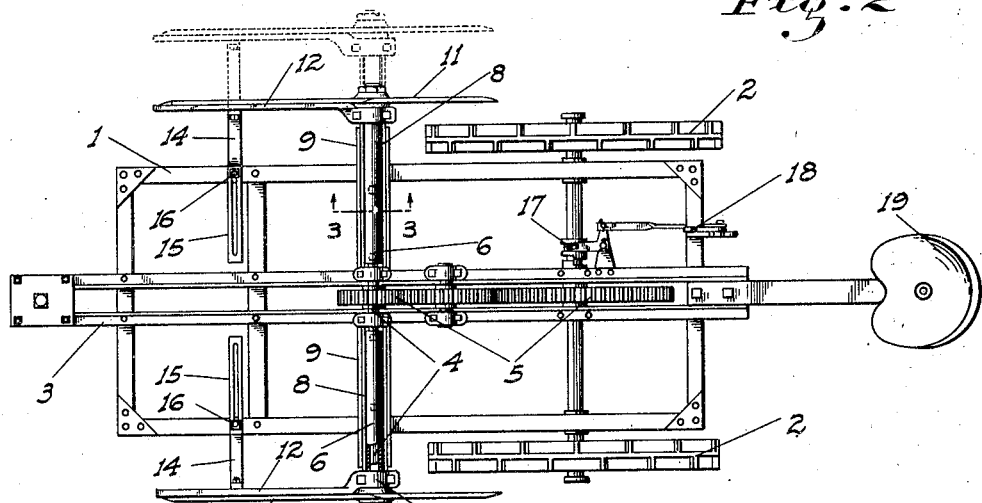
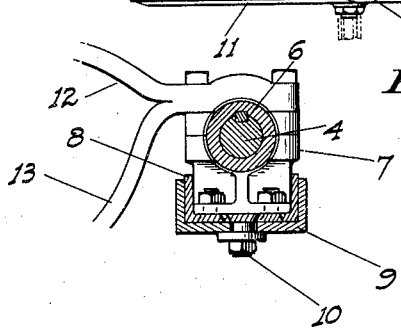
INVENTOR
*A. Bianchi*
BY 
ATTORNEY Patented Oct. 15, 1929

1,731,607

UNITED STATES PATENT OFFICE

AGOSTINO BIANCHI, OF MANTECA, CALIFORNIA

VINE-TRIMMING MACHINE

Application filed August 26, 1927. Serial No. 215,637.

This invention relates to agricultural machinery and particularly to a machine to be used in vineyards. It has long been appreciated by vineyardists that the trimming off of the long shoots or runners in the springtime promotes a better growth of grape clusters, with a consequent improvement in the crop, and also aids in the production of a profitable second crop in certain cases. Heretofore, however, it has been a long and arduous task to clip off the shoots, which attain a considerable length and frequently cover the ground in a tangled mass between the rows of vines.

The principal object of my invention therefore is to provide a machine for performing this operation which is adapted to travel between the rows and by means of which the shoots on adjacent sides of the two rows of vines will be cut simultaneously. The trimming mechanism of the machine is so arranged that practically all such shoots will be carried into the path of movement of the cutters without any physical manipulation of the shoots on the part of the workers being necessary to thus position said shoots.

A further object of the invention is to arrange the cutting mechanism so that it may be easily adjusted for operation between rows of vines which are differently spaced.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved vine trimming machine.

Fig. 2 is a top plan view of the same.

Fig. 3 is a fragmentary longitudinal section on the line 3—3 of Fig. 2.

Fig. 4 is a fragmentary section on the line 4—4 of Fig. 1.

Referring now more particularly to the characters of reference on the drawings, the machine comprises a main frame 1 of suitable construction, supported at its rear end by wheels 2 and having at its front end a tongue or drawbar 3 for attachment to any desired form of draft means.

Journaled onto the main frame intermediate its ends is a transverse shaft 4 which centrally of its length is connected in driving relation with the wheels 2 by gearing 5 or the like so that said shaft rotates at a speed considerably greater than that of the wheels. Feather keyed onto the shaft on each side of the gearing are independent sleeves 6 which are journaled in boxes 7. These boxes are mounted on independent transverse beams 8 which are slidable in transverse guides 9 fixed onto the main frame. The beams are held at any position in the guides by means of clamping bolts 10 or the like.

Fixed on the outer ends of the sleeves are cutters comprising a plurality of substantially radial knives 11 which may be all of one length or of different and alternating lengths as indicated in Fig. 1. These rotating knives are adapted to cooperate with stationary cutters which are in the form of upper and lower bars 12 and 13 which project forwardly and upwardly and downwardly respectively from adjacent the axis of the rotary knives, said bars being preferably secured to the boxes 7 adjacent the rotary cutters, as shown in Fig. 3.

Intermediate their ends each pair of bars 12 and 13 are connected by a brace member 14 which is provided with a transverse slotted strap 15 which overhangs and rests on the main frame and is adjustably secured thereto by a bolt 16 or the like.

By means of this arrangement it will be seen that either set of rotary and stationary cutters may be easily adjusted as a unit in or out relative to the main frame, so that the distance between the opposed cutters may be altered to suit the spacing of the rows of vines.

The lower stationary cutter bars 13 project to a point closely adjacent the ground so that they also serve as vine-shoot deflectors to lift the shoots up with the forward movement of the machine until they are placed into the path of cutting action of the rotating knives. The upper stationary bars 12 serve mainly to deflect shoots which are well clear of the ground downwardly toward the lower bars; or if the shoots hang exceptionally high they support the shoots while the rotating knives cut them off.

The gearing 5 may be disengaged from driving relation with the wheels when desired by a suitable clutch means indicated at 17, which is operated by a lever 18 disposed at a position convenient to the operator's seat 19 mounted on the frame 1.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A vine trimming machine including a frame adapted to be moved along the ground, a rotary cutting knife unit mounted on the frame to one side of the same, a stationary cutter and guide bar to cooperate with the knife unit projecting forwardly and downwardly from adjacent the axis of the knife unit, and a stationary bar to also cooperate with the knife unit projecting upwardly and forwardly from adjacent the axis of said unit.

2. A vine trimming machine including a frame adapted to be moved along the ground, a transverse shaft mounted on the frame, a sleeve slidably but nonturnably mounted on the shaft, a rotary cutting unit fixed on the sleeve, and laterally adjustable bearing and supporting means for the sleeve mounted on the frame.

3. A structure as in claim 2, with a stationary cutter bar mounted in fixed connection with the sleeve supporting means to cooperate with the cutting unit.

4. A vine trimming machine including a frame adapted to be moved along the ground, a transverse shaft mounted on the frame, a sleeve slidably but non-turnably mounted on the shaft, a rotary cutting unit fixed on the sleeve, a transverse member, a bearing box for the sleeve mounted on said member, a transverse guide element for said member fixed on the frame, and clamping means between said member and element.

In testimony whereof I affix my signature.

AGOSTINO BIANCHI.